United States Patent [19]

Sasaki et al.

[11] Patent Number: 4,905,045

[45] Date of Patent: Feb. 27, 1990

[54] IMAGE FORMING DEVICE USING POLARIZED LIGHT

[75] Inventors: Hiromu Sasaki; Akihiro Soga, both of Nara, Japan

[73] Assignee: Sharp Kabushiki Kaisha, Osaka, Japan

[21] Appl. No.: 330,963

[22] Filed: Mar. 29, 1989

Related U.S. Application Data

[63] Continuation of Ser. No. 163,229, Feb. 26, 1988, abandoned, which is a continuation of Ser. No. 1,688, Jan. 9, 1987, abandoned.

[30] Foreign Application Priority Data

Jan. 13, 1986 [JP] Japan .................................. 61-5521
Jan. 20, 1986 [JP] Japan .................................. 61-11415

[51] Int. Cl.[4] .................... G03G 15/04; G03G 21/00; G03B 27/72; G03B 27/62

[52] U.S. Cl. .................................. 355/229; 355/231; 355/71; 355/79

[58] Field of Search ............... 350/163, 370, 399, 407; 362/19, 394; 355/7, 8, 71, 75, 200, 202, 229, 231, 230

[56] References Cited

U.S. PATENT DOCUMENTS

| | | | |
|---|---|---|---|
| 2,252,324 | 8/1941 | Land | 350/370 X |
| 3,621,231 | 11/1971 | Craig | 350/370 X |
| 3,671,104 | 6/1972 | Seino | 350/407 X |
| 4,285,577 | 8/1981 | Schuler | 350/407 X |
| 4,338,020 | 7/1982 | Yukawa et al. | 355/75 X |
| 4,568,181 | 2/1986 | Nishiyama | 355/75 |
| 4,595,285 | 6/1986 | Miwa et al. | 355/75 |

*Primary Examiner*—A. T. Grimley
*Assistant Examiner*—Ed Pipala
*Attorney, Agent, or Firm*—Flehr, Hohbach, Test, Albritton & Herbert

[57] ABSTRACT

An image forming device such as a copying machine provides a linearly polarized beam of light to be made incident on a document to be scanned which is placed on a document table. A transparent cover with a polarization filter attached to it covers the document such that the user can ascertain, without too much light entering his eyes, whether the document is placed at a correct position on the table.

3 Claims, 4 Drawing Sheets

IMAGE FORMING DEVICE USING POLARIZED LIGHT

This is a continuation of application Ser. No. 163,229, filed Feb. 26,1988, abandoned, which is a continuation of application Ser. No. 001,688 , filed Jan. 9, 1987, now abandoned.

BACKGROUND OF THE INVENTION

This invention relates to an image forming as a copying machine and more particularly to a device which forms an image by causing polarized light to be reflected by a document and exposing a photosensitive drum to this reflected light.

In a device for forming an image by causing light from a source to be reflected by a document and exposing a photosensitive drum to this reflected light it is customary to place the source of light under a transparent document table on which the document to be scanned is placed and either the document or the light source is moved with respect to the other such that the light from the source which scans the document is reflected by it and made incident onto the photosensitive drum. Such a document table is frequently provided with a cover which is openable and serves to keep the document pressed against the table surface. Such a cover is usually made of a non-transparent material so as to protect the user's eyes against the light from the source. Because of this non-transparency, however, the user is unable to ascertain if the document is correctly positioned on the table.

SUMMARY OF THE INVENTION

It is therefore an object of the present invention to provide an image forming device such as a copying machine with a document cover through which the user can ascertain if the document is correctly positioned on the table without hurting his eyes by the light from the source.

The above and other objects of the present invention are achieved by providing an image forming device with a document carrying table comprised of a transparent member and a polarization filter and a document cover comprised of a transparent member and another polarization filter such that the directions of polarization of these two filters are nearly perpendicular to each other. With a device thus structured according to the present invention, the position of the document can be checked easily because the document cover is transmissive to light polarized in a certain direction but since the light transmitted through the document table is nearly entirely intercepted by the filter on the cover, operator will not be blinded by the light from the source. Alternatively, the image forming device may be provided with a polarized light source such that the light emitted therefrom is polarized nearly perpendicularly to the direction of polarization of the filter on the transparent document cover.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1A:
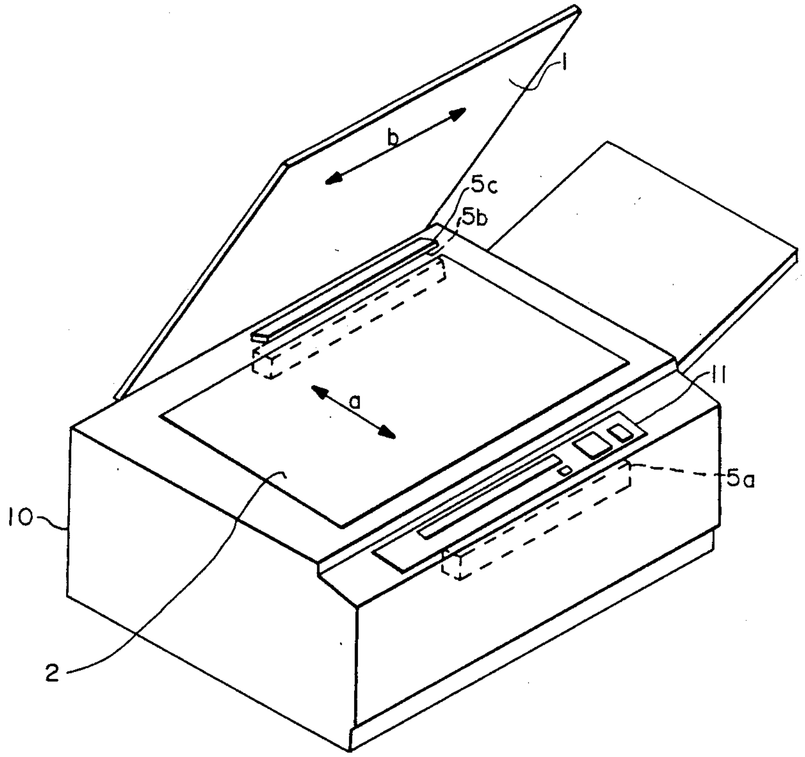
FIG. 1A is a perspective view of a copying machine embodying the present invention.
Figure 1B:
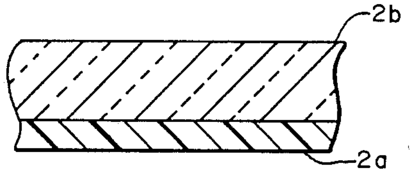
FIG. 1B is a sectional view of a portion of the document table of the copying machine of the FIG. 1A.

With reference to FIG. 1A which is a perspective view of a copying machine embodying the present invention, the upper part of its housing 10 includes a document table 2. As shown in FIG. 1B, the document table 2 is formed with a transparent plate **2*b* tightly attached to the top surface of a polarization filter 2*a***. In FIG. 1, the arrow a indicates the direction of linearly polarized light which passes through the document table 2.

Figure 1C:
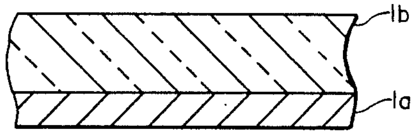
FIG. 1C is a sectional view of a portion of the document cover of the copying machine of FIG. 1A.

On top of the document table 2, there is provided a document cover 1 which is supported rotatably around an axis on the back edge of the housing 10. As shown in FIG. 1C, the cover 1 is formed with a transparent plate lb- tightly attached to the top surface of another polarization filter **1*a*. In FIG. 1, the arrow b indicates the direction of polarization of light which can be transmitted through the cover 1. The filters 1*a* and 2*a* are so arranged that the arrows a and b are nearly perpendicular to each other. The document table 2 and the cover 1** may be formed alternatively with a transparent plate attached to the bottom surface of a polarization filter instead of its top surface.

With reference again to FIG. 1A, numeral 11 indicates a control panel for the copying machine. Below this control panel 11 on the front side, there is provided a group of LED lamps **5*a*. Opposite thereto and below the document table 2 is a sensor 5*b* for detecting the document size. A reflector 5*c* is disposed above the document table 2 and above the sensor 5*b* such that light from the lamps 5*a* is reflected to the sensor 5*b*. The sensor 5*b* determines the size of a document placed on the table 2 by detecting the range in which the light from the lamps 5*c*** is obstructed.

Figure 2:
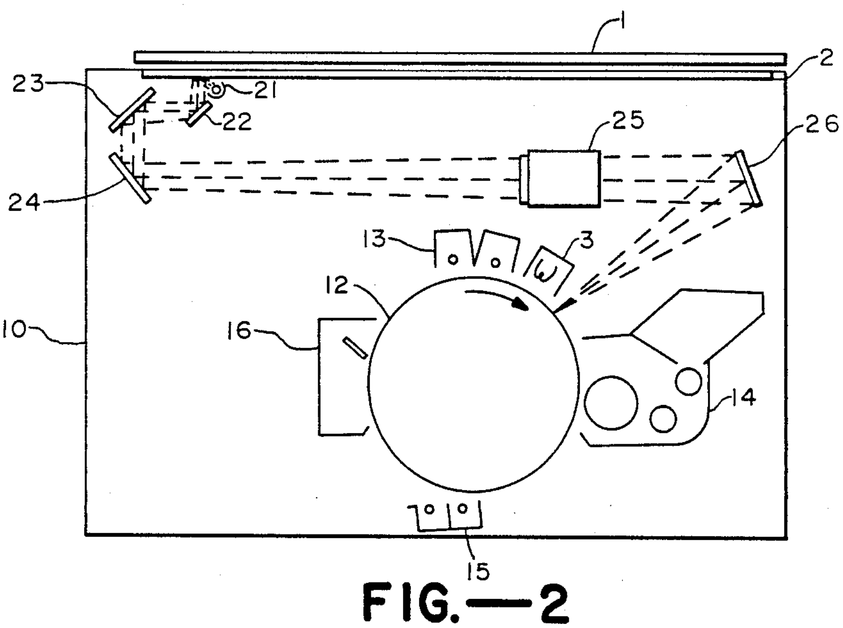
FIG. 2 is a schematic front view showing the structure of the copying machine of FIG. 1A.

With reference next to FIG. 2 which shows the structure of a main part of this copying machine, the housing 10 contains in its upper part a mobile light source unit which includes a light source 21 and a first mirror 22 in a unitized structure and is adapted to slide transversely inside the housing 10 and near the document table 2. A second mirror 23 and a third mirror 24 form another unit which can move parallel to and at one-half the speed of the light source unit. A lens 25 and a fourth mirror 26 are disposed on the optical axis of the reflected light from the third mirror 24. A photosensitive drum 12 is disposed in the center section of the housing 10. Around the photosensitive drum 12 are a primary charger 13, a blank lamp 3 to be described more in detail below, a developing device 14, a transfer-paper removing charger 15 and a cleaning device 16, in this order.

Figure 3A:
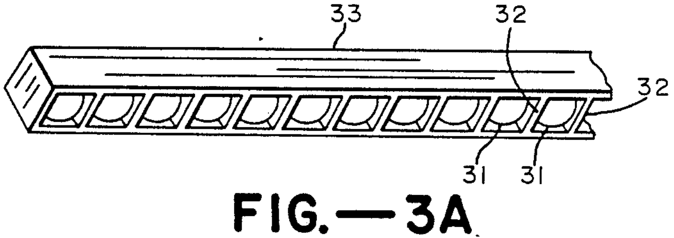
FIG. 3A is a perspective view of a portion of the blank lamp of the copying machine of FIG. 1A.

The blank lamp 3 is installed parallel to the axis of rotation of the photosensitive drum 12. The blank lamp 3 is provided because the portion of the light from the source 21 polarized perpendicularly to the polarization filter 1*a* is nearly entirely absorbed in the edge areas of the table 2 not covered by the document placed thereon and this prevents the surface areas on the photosensitive drum 12 where image is not formed from becoming exposed to light. Toner would then tend to be attached to such unexposed areas of the drum surface and the blank lamp 3 serves to provide light to these areas. As shown in FIG. 3A, the lamp 3 comprises a large number of LED lamps 31 inside a housing 33, individually separated by partition walls 32 so that the beams from mutually adjacent LED lamps 31 will not interfere with each other.

Figure 3B:
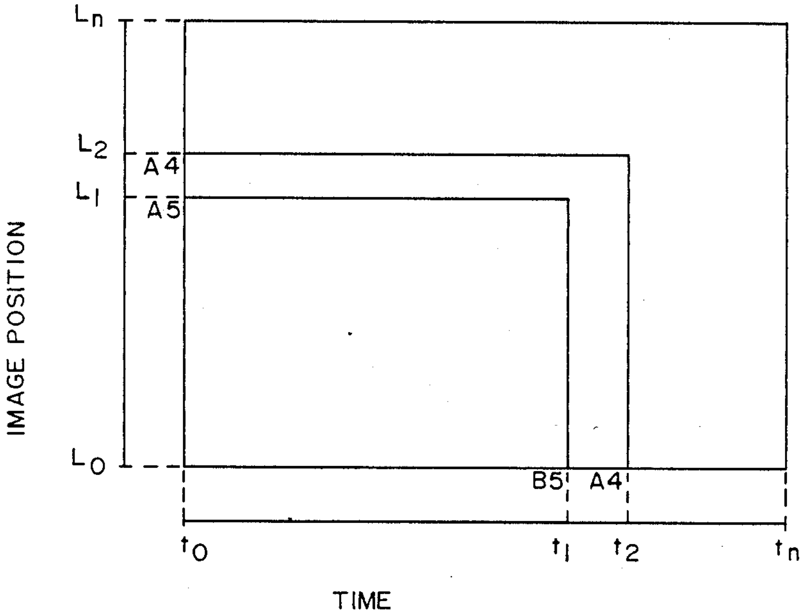
FIG. 3B is a graph showing the relationship between the position of image and timing for operating the blank lamp of FIG. 3A.

If the cover 1 is closed after a document to be scanned is placed on top of the table 2 of FIG. 1A, the user can ascertain the position of the document because the cover 1 is transmissive to light linearly polarized in the direction of the filter 1*a*. Since the direction of polarization of this filter 1*a* (shown by the arrow b) is nearly perpendicular to that of the filter 2*a* on the table 2 (shown by the arrow a), light from the source 21 is nearly completely prevented from passing through and hence hurting the user's eyes. The size of the document on the table 2 is detected by the sensor 5*b* and the group of LED lamps 31 in the blank lamp 3 to be turned on is determined according to the detected size of the document. Positions of the LED lamps to be turned on and the timing by which these lamps are switched on and off are shown in FIG. 3*b* for different document sizes. On the horizontal axis, $t_0$ indicates the time at which the position of the blank lamp 3 coincides with the front edge of the image on the photosensitive drum 12. The time at which the position of the blank lamp 3 coincides with the back edge of the image on the photosensitive drum 12 is indicated by $t_1-t_n$, depending on the size of the document. If the document size is B5, for example, it is $t_1$, and so forth. $L_0$ indicates a reference position, coinciding with an end position of the blank lamp 3 parallel to the axis of rotation of the photosensitive drum 12. $L_n$ indicates the position of the other end of the blank lamp 3. The reference position $L_O$ also represents one of the edges of the image-forming area. The other edge is indicated by $L_1-L_n$, depending on the size of the document. If the document size is B5, only the LED lamps in the range between $L_1$ and $L_n$, where no desired image is formed, are lit from $t_0$ to $t_1$ while the LED lamps between $L_0$ and $L_1$ remain extinguished. After the time $T_1$, all LED lamps within the interval $L_0$ and $L_n$ are lit.

Figure 4:
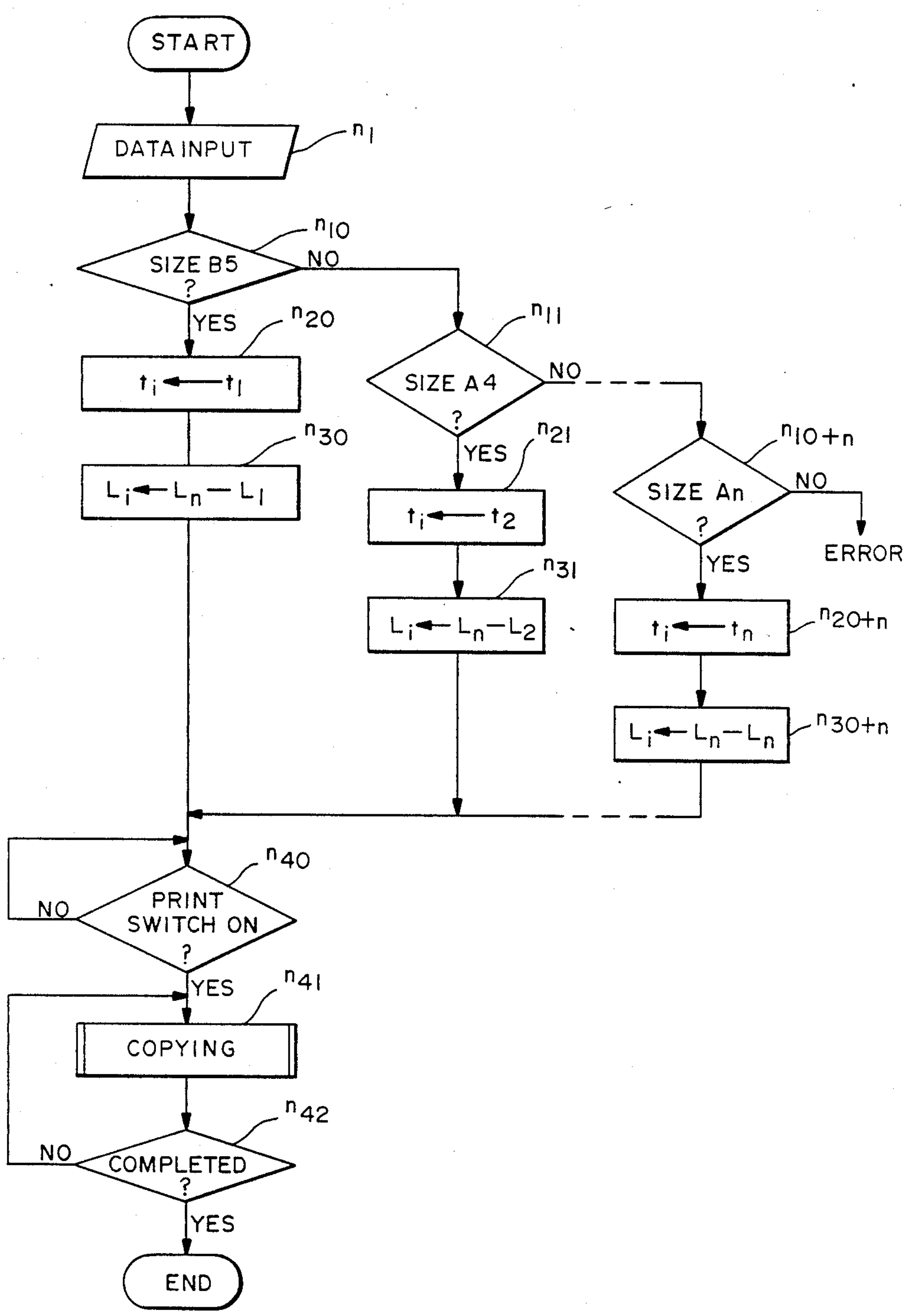
FIG. 4 is a flow chart for the operation of the copying machine of FIG. 1A.

Before the aforementioned control is carried out, the distances $L_i$ between the image-forming positions $L_1-L_n$ and the maximum image-forming position $L_n$ is set in a buffer. The blank lamp 3 is switched on and off on the basis of such set data. As shown in FIG. 4 which is a flow chart for the control of the aforementioned copying machine, the number of copies to be made and other input data are entered ($n_1$) after the fixing device is heated and other preliminary steps are completed. Simultaneously, the size of the document on the table 2 is determined by the sensor 5*b* ($n_{10}$ through $n_{10+n}$). Thereafter, the lengths $L_i$ corresponding to document sizes and the time intervals $t_i$ (from $t_0$) are stored in the buffer. After these preliminary steps are completed, the system waits until the PRINT switch (not shown) is turned on ($n_{40}$) and copying operation is carried out ($n_{41}$) until the desired number of copies are produced ($n_{42}$). This is how the blank lamp 3 is used efficiently to prevent toner from becoming attached to the areas on the photosensitive body 12 where no image is formed.

Figure 5:
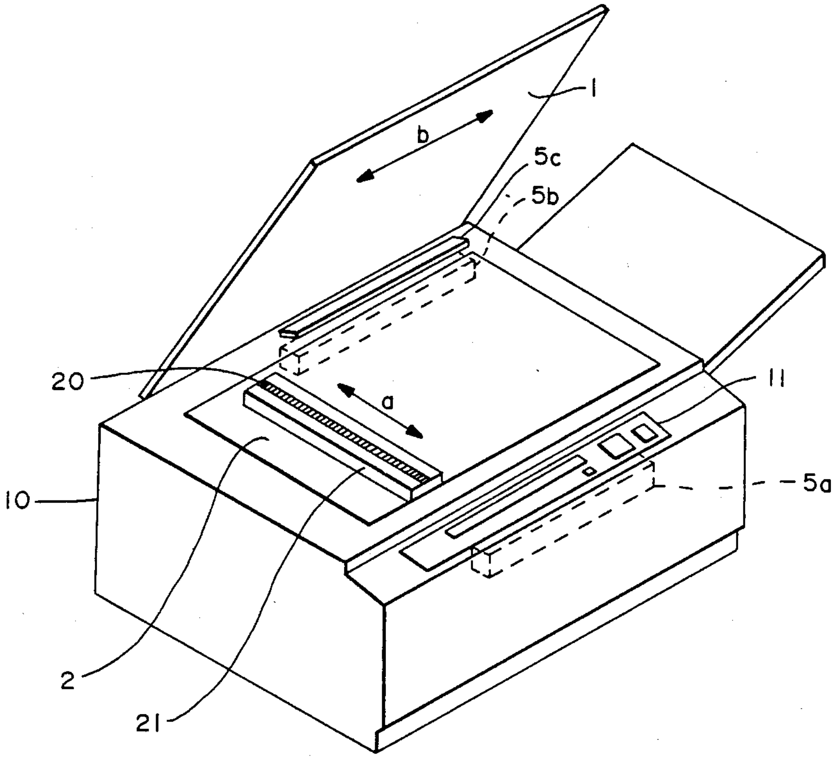
FIG. 5 is a perspective view of a copying machine according to another embodiment of the present invention.

The foregoing description of a preferred embodiment of the invention has been presented for purposes of illustration and description. It is not intended to be exhaustive or to limit the invention to the precise form disclosed, and many modifications and variations are possible in light of the above teaching. For example, the light source 21 of FIG. 2 may comprise a longitudinally assembled laser diodes with direction of linear polarization aligned along the arrow a such that the polarization filter 2*a* may be dispensed with. Such an embodiment of the present invention is illustrated in FIG. 5 wherein components which are identical to those in FIG. 1A are indicated by identical numerals. Numeral 20 therein indicates the laser diodes. Any such modifications and variations that may be apparent to a person skilled in the art are intended to be included within the scope of this invention.

What is claimed is:

1. An image forming device comprising
   - a light source including laser diodes assembled along a specified direction, said laser diodes adapted to emit light which is linearly polarized in said specified direction,
   - a document table plate for placing a document sheet thereon, said document table plate being disposed above said light source and is transmissive to light from said light source, and
   - a cover plate which can be placed over said table plate and to thereby sandwich a document sheet between said document table plate and said cover plate, said cover plate functioning as a linear polarizer with the direction of polarization nearly perpendicular to said specified direction when said cover plate is placed over said table plate such that the position of a document sandwiched between said plates is visually ascertainable through said cover plates but linearly polarized light from said light source is substantially prevented from passing through both said plates.

2. The image forming device of claim 1 wherein said device further comprises a sensor for detecting the size of said document.

3. The image forming device of claim 1 wherein said cover plate comprises a transparent base plate and a polarizing filter covering said base plate.

* * * * *